United States Patent
Aaby et al.

(10) Patent No.: US 7,664,490 B2
(45) Date of Patent: Feb. 16, 2010

(54) METHOD FOR INSTANT SCHEDULING OF CONFERENCE CALLS

(75) Inventors: Carl Aaby, Lier (NO); Nicolai Grodum, Oslo (NO)

(73) Assignee: Tandberg Telecom AS, Lysaker (NO)

( * ) Notice: Subject to any disclaimer, the term of this patent is extended or adjusted under 35 U.S.C. 154(b) by 680 days.

(21) Appl. No.: 11/485,978

(22) Filed: Jul. 14, 2006

(65) Prior Publication Data

US 2007/0022201 A1    Jan. 25, 2007

(30) Foreign Application Priority Data

Jul. 15, 2005    (NO) .................................. 20053478

(51) Int. Cl.
*H04M 3/42*    (2006.01)

(52) U.S. Cl. ........................ 455/416; 455/415; 455/417; 455/466; 379/93.21; 379/158; 379/201.01

(58) Field of Classification Search ................ 455/416, 455/415, 417, 466; 379/93.21, 158, 202.01

See application file for complete search history.

(56) References Cited

U.S. PATENT DOCUMENTS

| | | | |
|---|---|---|---|
| 2002/0071540 A1 | 6/2002 | Dworkin | |
| 2002/0118809 A1 | 8/2002 | Eisenberg | |
| 2003/0101247 A1 | 5/2003 | Kumbalimutt et al. | |
| 2004/0215723 A1 | 10/2004 | Chadha | |
| 2004/0248600 A1 | 12/2004 | Kim | |
| 2005/0047582 A1 | 3/2005 | Shaffer et al. | |
| 2005/0221813 A1* | 10/2005 | Rajahalme et al. | ........ 455/422.1 |

* cited by examiner

*Primary Examiner*—Nghi H Ly
(74) *Attorney, Agent, or Firm*—Oblon, Spivak, McClelland, Maier & Neustadt, L.L.P.

(57) ABSTRACT

A method, system and computer program product for establishing a call in a communication system including an Instant Messaging (IM) application provided by a Session Initiated Protocol (SIP) server connected to a number of IM clients, each associated with at least one conference endpoint managed by one or more management systems at least adapted to schedule and/or investigate possibilities for a conference between two or more individuals.

22 Claims, 4 Drawing Sheets

METHOD FOR INSTANT SCHEDULING OF CONFERENCE CALLS

BACKGROUND OF THE INVENTION

1. Field of the Invention

The present invention relates to managing, scheduling and initiating videoconferences.

2. Discussion of the Background

Conventional videoconferencing systems comprise a number of end-points communicating real-time video, audio and/or data streams over and between various networks such as WAN, LAN and circuit switched networks.

A number of videoconference systems residing at different sites may participate in 10 the same conference, most often, through one or more MCUs (Multipoint Control Unit) performing via switching functions to allow the audiovisual terminals to intercommunicate properly.

As videoconferencing involves various recourses and equipment simultaneously interoperating at different localizations and capabilities, there is a need for the possibility to manage the resources involved both for scheduled and ad hoc videoconferences.

Videoconferencing systems are therefore often provided with a management system. A management system is a module that is used to schedule or book resources at any given point in time. The management system will allow a user to request resource usage at a given time, and either allow or disallow the usage at that time. Management systems are often used for scheduling the use of meeting rooms, network resources, video systems etc. The management system must be connected to a database containing updated information regarding all accessible resources like MCUs, gateways, routers, end-points etc.

A management system may for example provide system and resource overview, allowing the user to create, edit, and delete reservations, reserve resources for dial-in participants and specify bandwidth and network settings. The management system may also support automatic call routing and automatic selection of point-to-point connection, including one or more MCUs. The management system normally operates with an intuitive web interface requiring no additional installation on the user terminal other than a conventional web browser.

Even if users have audio or videoconferencing equipment available, either as personal or group systems, a large problem with scheduling meetings using audio and videoconferencing equipment is knowledge of which resources are available to a given participant. In many cases, it is necessary for the one that is booking the conference to ask the participants in person about which localizations and systems etc. are accessible to them at the particular moment, and which accessories and services they have available or which is preferable. This manual "round-robin" request is added to the use of a management system, causing delay in conference booking and reducing the utilitarian value of the management system. The lack of knowledge regarding the participants' access and preferences is also the main reason that ad-hoc conferences are difficult to set-up—they simply require too much fluctuating knowledge of the far end side from the users.

Another problem regarding ad-hoc scheduling is that even if the management system knows that a certain end-point is available and ready for use, it cannot know whether the participants are present at the different sites, when the videoconference is not pre-scheduled. Ad-hoc booking will then normally also require manuals requests in the form of additional calls to the participants in advance, making it behave like a pre-scheduled call.

These problems are now more often met by connecting the management system to a presence application. Presence applications are known as applications indicating whether someone or something is present or not. A so-called "buddy list" on a user terminal shows the presence of the people or systems (buddies) that have been added to the list, The list will indicate if the "buddy" is present or not (logged on the computer, working, available, idle, or another status). The presence functionality creates a feeling of presence also with people or things that are located in other buildings, towns, or countries.

Presence applications are often found in conjunction with Instant Messaging (IM) applications. These applications extend the presence application by adding the possibility of exchanging information between present "buddies". The information exchange may include applications like chat, messaging and conferencing.

In Presence and IM applications, there is a central server keeping track of all the clients in the system, while the client provides the server with information about their own state and location. The server also handles user login and provide information of the "buddies" in respective "buddy list" by using a proprietary protocol. However, information between clients ("buddies") may be transmitted directly as the server provides connection information (IP address and port number) of the client's "buddies".

Conventionally, the protocol used in the application layer of IM communication is SIP (Session Initiated Protocols). SIP is an Internet Engineering Task Force (IETF) standard protocol for initiating an interactive user session that involves multimedia elements such as video, voice, chat and gaming. SIP is a request-response protocol, dealing with requests from clients and responses from servers. Participants are identified by SIP URIs. Requests can be sent through any transport protocol, such as UDP, SCTP, or TCP. SIP determines the end system to be used for the session, the communication media and media parameters, and the called party's desire to engage in the communication. Once these are assured, SIP establishes call parameters at either end of the communication, and handles call transfer and termination. As already indicated, SIP requires a central server i.a. for signaling, registration and policy handling. Such SIP servers are usually integrated with the presence server mentioned above in connection with presence and IM applications. Microsoft Live Communications Server (LCS) is an example of server software for presence and IM applications, where users can send instant messages and communicate using web cameras through an IM client such as MS Communicator or Windows Messenger.

The connection between the presence application and the management system may appear for the users in many ways. The most convenient would probably be to integrate the management system in the IM/Presence application or vice versa. Hence, allow the user to see the presence of both the user and system. A double click on a "buddy" in a "buddylist" may e.g. execute an immediate initiation of a call set up to the "buddy" using the most preferred idle system associated with the "buddy". A click on further "buddies" preferably includes them in the call constituting a conference, all provided by the functionalities already available in the management system. The management system may be instructed by requests from the presence application using the proprietary protocol.

However, management systems and IM applications are developed for different purposes and uses different protocols. The integration of these different "worlds" often requires non-proprietary solutions and additional processing power. This is an obstacle for interoperability between vendor products, which again is an obstacle for the penetration of communication applications.

SUMMARY OF THE INVENTION

It is an object of the present invention to provide a method and a system avoiding the above described disadvantages.

It is a further object of the present invention to provide a method and a system for integrating conventional IM application with conventional management system in a non-proprietary and process effective way.

The method and system according to the invention are defined by the features set forth in the appended, independent claims. Advantageous features are indicated in the dependent claims.

In particular, the present invention provides a method for establishing a call in a communication system including an Instant Messaging (IM) application provided by a Session Initiated Protocol (SIP) server connected to a number of IM clients, each associated with at least one conference endpoint managed by one or more management systems at least adapted to schedule and/or investigate possibilities for a conference between two or more individuals. The method includes transmitting a first SIP invite message from an inviting IM client to the SIP server including a Global Unique Identifier (GUID), a first SIP Uniform Resource Identifier (URI) identifying said inviting IM client and a second SIP URI identifying an invited IM client; upon reception of said first SIP invite message in the SIP server, investigating in the management system whether the respectively associated endpoint of said inviting IM client and said invited IM client satisfy a predetermined set of conditions, at least including whether the respective associated endpoints are idle, if said set of conditions are satisfied, transmitting a second SIP invite message from the SIP server to said invited IM client; and if said SIP invite message is accepted by said invited IM client, returning a SIP invite accept message to the SIP server and instructing the management system to set up a call between the respectively associated endpoint of said inviting IM client and said invited client.

The invention also relates to a corresponding communication system and computer program product.

BRIEF DESCRIPTION OF THE DRAWINGS

In order to make the invention more readily understandable, the discussion that follows will refer to the accompanying drawings.

DETAILED DESCRIPTION OF THE INVENTION

In the following, the present invention will be discussed by describing preferred embodiments, and by referring to the accompanying drawings. However, people skilled in the art will realize other applications and modifications within the scope of the invention as defined in the enclosed independent claims.

The present invention introduces a novel mechanism for IM client end users who want to use desktop Video Conferencing System (VCS) instead of an integrated software/web-camera video conferencing solution. This is utilized by using a management system as mentioned above, or in this context, a Video Conference Management Program (VCMP), to set up video conference calls between any from an IM client, even ISDN based VCSs. Having a VCMP to manage the call also allows calls between protocols if a network gateway is available for use. In addition, an administrator can monitor the status of the call and the VCMP can store call logs and statistics. This is provided by the present invention by integrating VCMPs with presence an IM servers like Microsoft's Live Communication Server (LCS) in a non-proprietary way. The extensibility of e.g. the IM clients MS Communicator and Windows Messenger allows very little customization of the user interfaces. To ease the deployment of such an integration, the present invention preferably makes the installation of the integration a server-side component, with only configuration requirements on the clients.

Conventional IM clients allow a "custom application" to be defined, which uses a protocol where one IM client user invites a buddy to a session of this application, and waits for his approval. According to the present invention, a video—or alternatively, a web conference is defined as such an application, and processing the invites and acceptances of these requests on e.g. an LCS server. A VCMP, with which the LCS server is integrated, will then be instructed to book the VCSs and set up a call between the VCSs of the inviter and the invited "buddy".

The IM client users then have to be bound to a specific VCS that is managed by the VCMP. This is done either by logging on to the VCMP server through a web browser, or by adding a custom tab page in the IM client that shows a web page on the VCMP server.

The IM clients will, as already indicated, be connected to a SIP server used for keeping track of applications, user presence, handling and forwarding SIP messages etc. Further, Registry keys defining the actions that are to be made available from the User Interface (UI) of the IM client are added in the Registry of the IM client computers. Each action then has a unique id (a GUID) that identifies the action, and a name of the action as it is shown to the IM user. In the context of the present invention, an application with the identical unique id must have been defined in the registry on both the inviter and the invitee of a call.

Figure 1:
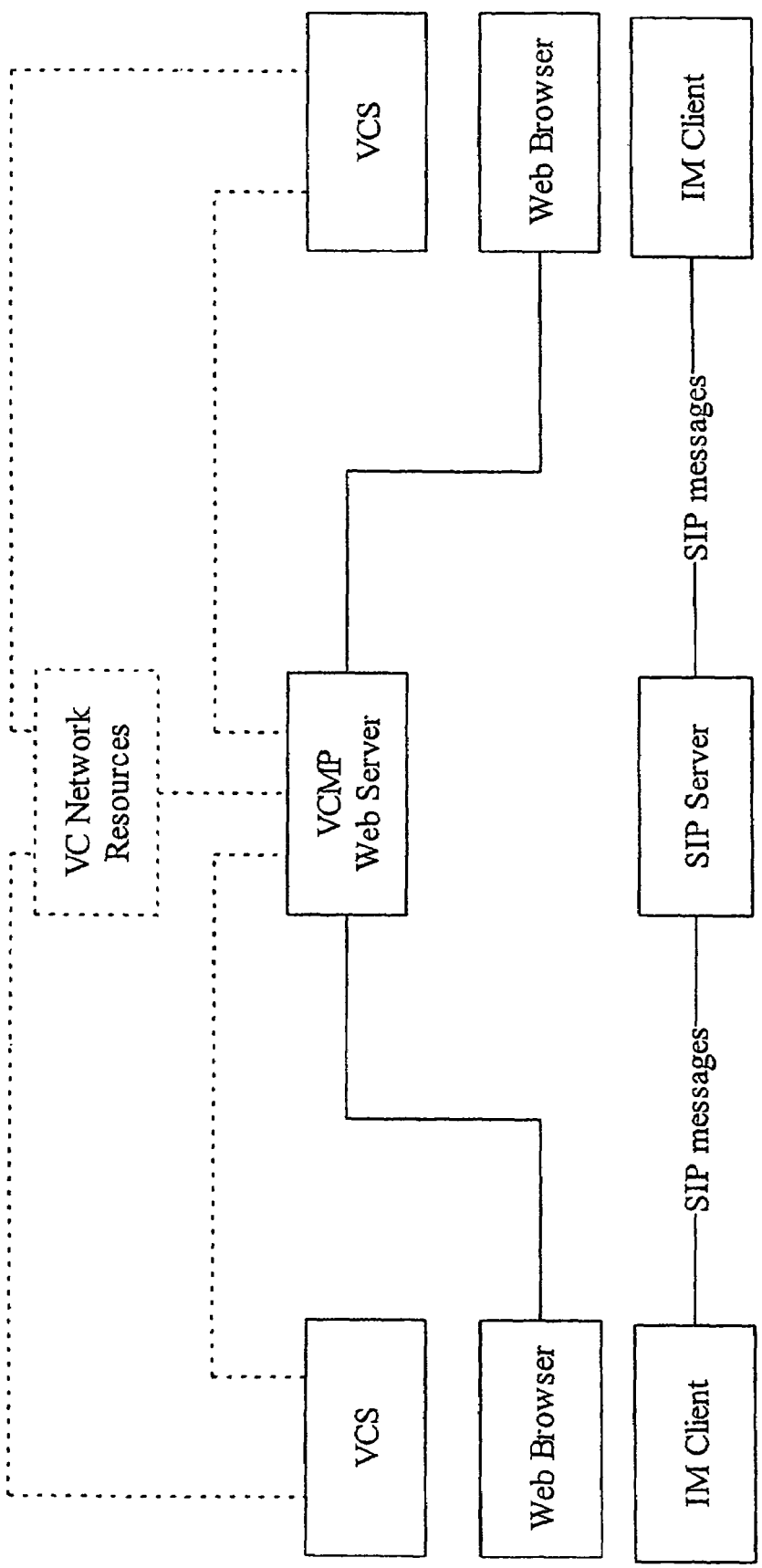
FIG. 1 is a system overview of the combination of a conference management system and an IM application according to prior art.
Figure 2:
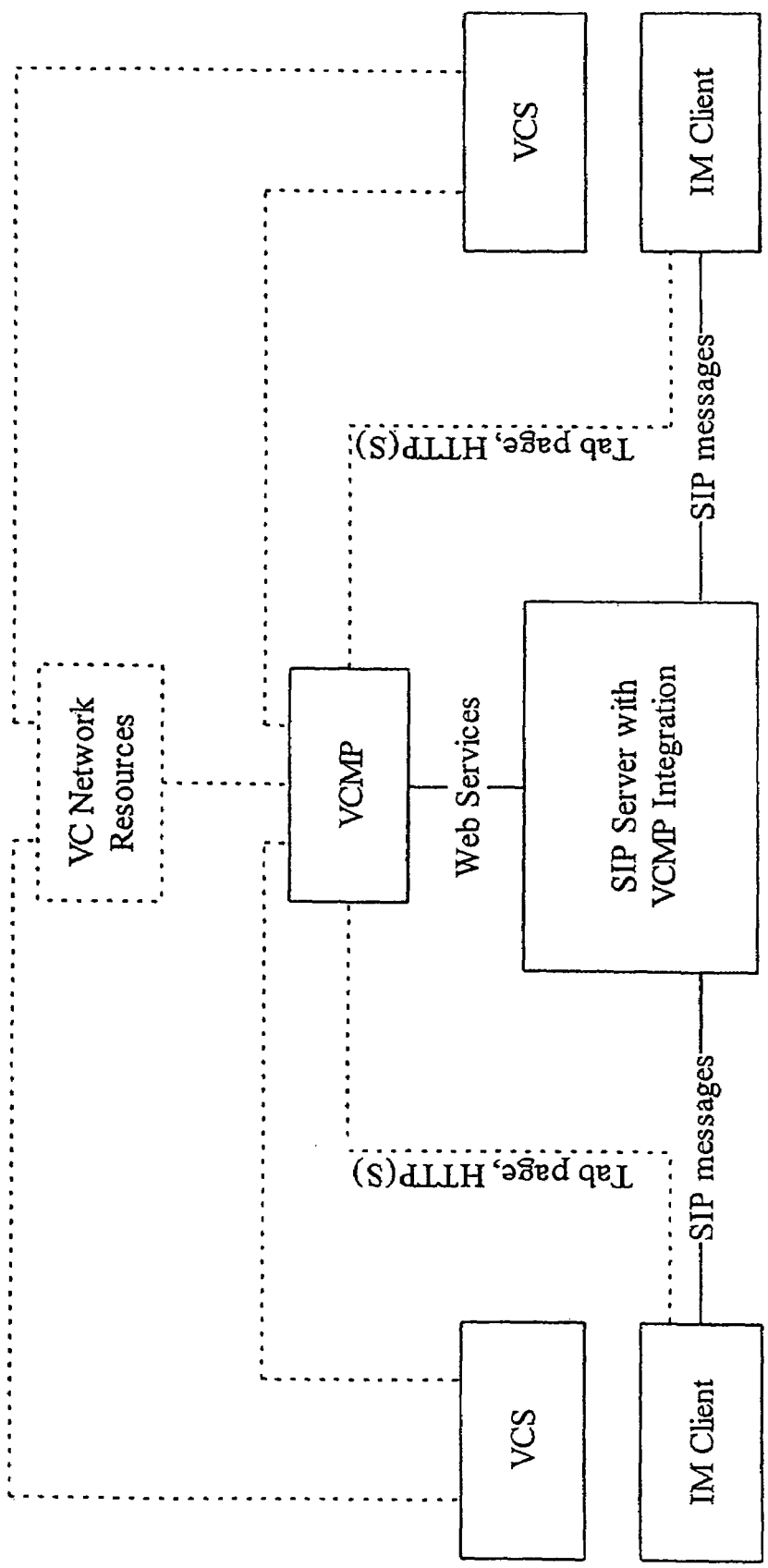
FIG. 2 is a system overview of one embodiment of a system according to the present invention.

FIG. 2 shows the overall architecture of a preferred embodiment of a system according to the present invention. In addition to the IM Clients, the VCMP server and the VCS systems, the SIP Server is added with a VCMP Integration software, and is connected to the VCMP server through a web service interface.

Figure 3:
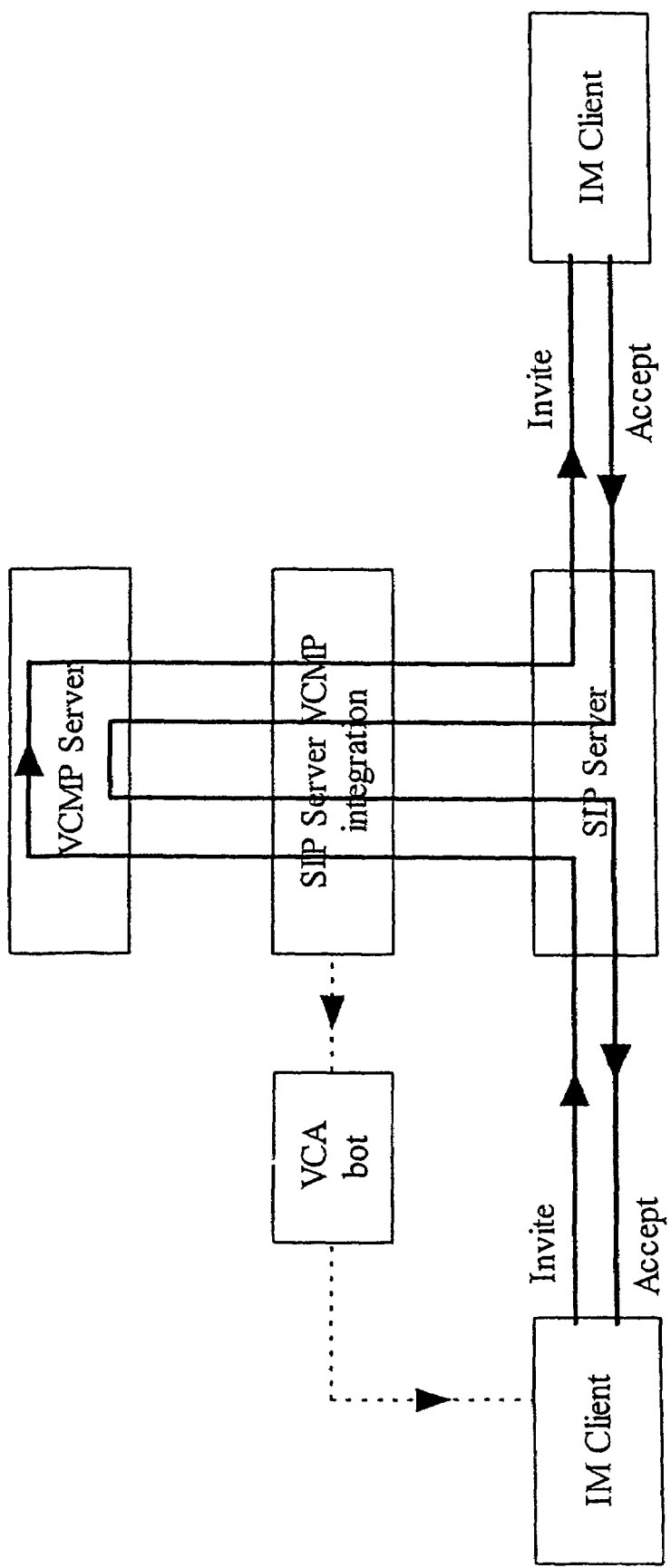
FIG. 3 illustrates the message flow in an accepted call invitation according to one embodiment of the present invention.
Figure 4:
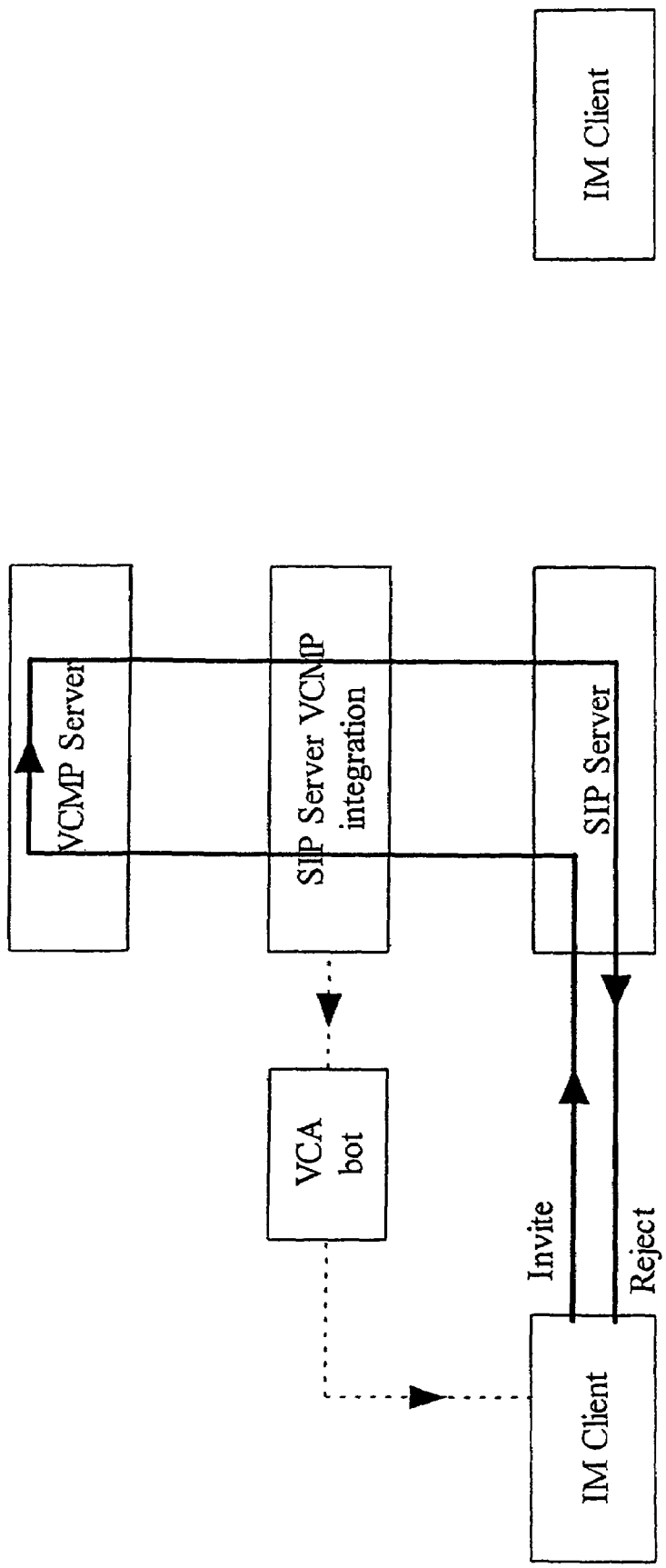
FIG. 4 illustrates the message flow in rejected call invitation according to one embodiment of the present invention.

In the following an example of the message flow of an example of the present invention is described, referring to FIGS. 3 and 4.

When a user wishes to initiate a video call through his IM client, he may click on a certain call icon associated to the invited "buddy" in his buddy list. This will trigger a transmission of a SIP invite message containing the unique application id and the SIP un of both the inviter and invitee to the SIP server. The SIP message is processed by the integration software on the SIP server. This software contacts the VCMP (using web services) to verify that both the users have associated a preferred VCS, that these VCSs are not currently in use, that the users have permissions to use them and that all (if any) required network components (e.g. an MCU) for the requested call are available.

If any of these conditions are not met, an IM bot, called a 'video conference assistant' (VCA), sends an instant message to the inviter describing the reason for failure and cancels the invitation. An IM bot is a virtual "buddy" in IM application automatically generating IM messages for assistance and information.

However, if all the conditions are met, the invitation is forwarded to the invitee in another SIP invite message. The integration will then preferably tentatively book the systems for use by the inviter, If the invitee accepts the invitation, a SIP accept message is returned to the SIP server and is processed by the VCMP integration software. The VCMP integration software remotely instructs the VCMP to start the call, and to book the resources to be used.

Also, a thread in the SIP server will preferably start polling the VCMP for status of the call. The VCA is then able to inform the parties about the status of the call through the IM application, As an example, if there was an error setting up the call, the reason for this will be reported to the IM user in an instant message from the VCA.

The procedure above could also be applicable for establishing a web conference. Then, the SIP invite message will make sure web conferencing is available from the VCMP, and the accept message will book a web conference using a pre-defined or randomly generated password. The un and password needed to join the web conferences will be sent to both the inviter and the invitee from the VCA, in form of instant messages.

In order to select which VCS is to be used (per IM user), an account or user profile may be configured with a primary system in the 'VCMP (or other means—such as my "virtual (personal) resource. This operation can be incorporated into the IM client by using custom tab pages. These are added by creating a registry key (taburl) that points to an (auto-generated) xml document on the web server of the VCMP. This xml document contains the URL of the web page that is to be shown in the IM client as a tab page. When the IM user opens this tab, a log-on to the VCMP web server must be performed, and the VCMP is therefore able to identify and authenticate the user. The page will be rendered in the built in browser of the IM client. The IM user also has the possibility to end any call running on his primary VCS from this page, as well as call any other H320/H323/SIP VCS directly or through a gateway.

One of the advantages of the present invention is that from the VCMP point of view it simplifies ad-hoc scheduling of VCSs for the end users, and makes video conferencing more available to users.

Further, from the SIP point of view, the present invention allows non-SIP VCS s to be called to and from, directly from the IM client.

The preceding system and method may be implemented via software and/or firmware found in a general purpose computer or in a special purpose computing device. A description of computing devices and software is found in "How Computers Work" by Ron White, Macmillan Computer Publishing USA, the contents of which are incorporated herein by reference.

The invention claimed is:

1. A method for establishing a call in a communication system including an Instant Messaging (IM) application provided by a Session Initiated Protocol (SIP) server connected to a number of IM clients, each associated with at least one conference endpoint managed by one or more management systems at least adapted to schedule and/or investigate possibilities for a conference between two or more individuals, comprising:

transmitting a first SIP invite message from an inviting IM client to the SIP server including a Global Unique Identifier (GUID), a first SIP Uniform Resource Identifier (URI) identifying said inviting IM client and a second SIP URI identifying an invited IM client;

upon reception of said first SIP invite message in the SIP server, investigating in the management system whether the respectively associated endpoint of said inviting IM client and said invited IM client satisfy a predetermined set of conditions, at least including whether the respective associated endpoints are idle;

if said set of conditions are satisfied, transmitting a second SIP invite message from the SIP server to said invited IM client; and if said second SIP invite message is accepted by said invited IM client, returning a SIP invite accept message to the SIP server and instructing the management system to set up a call between the respectively associated endpoint of said inviting IM client and said invited client.

2. The method according to claim 1, further comprising:
if said second SIP invite message is accepted by said invited IM client, booking required resources for said call in the management system.

3. The method according to claim 2, further comprising:
if said set of conditions are satisfied, tentatively booking required resources for said call in the management system; and
if said second SIP invite message not is accepted by said invited IM client, releasing said required resources for said call that tentatively have been booked in the management system.

4. The method according to claim 1, further comprising:
if said set of conditions are not satisfied, transmitting an IM message to said invited IM client including information stating that a call between the respectively associated endpoint of said inviting IM client and said invited client is not allowed, and a reason for non-allowance.

5. The method according to claim 1, further comprising:
if said second SIP invite message not is accepted by said invited IM client, transmitting an IM message to said invited IM client including information stating that said invited IM client not accepted to establish a call.

6. The method according to claim 1, wherein said set of conditions further includes whether said inviting IM client and said invited IM client are allowed to used the respective associated conference endpoint and whether required resources for establishing and maintaining a call between the respective associated conference endpoints are available.

7. The method according to claim 1, wherein said steps of investigating and booking includes investigating and booking through a web interface between the STP server and the management system or between one of said IM clients and the management system.

8. The method according to claim 1, further comprising:
if said second SIP invite message is accepted by said invited IM client, repetitively polling the management system for status information about the call, and reporting said status information to said inviting IM client and said invited IM client in an IM massage, consistently, or at certain, predefined occasions.

9. A communication system, comprising:
a Session Initiated Protocol (SIP) server having an Instant Messaging (IM) application and connected to a number of IM clients, each associated with at least one conference endpoint managed by one or more management systems at least adapted to schedule and/or investigate possibilities for a conference between two or more individuals, and to interface to an inviting IM client configured to transmit to the SIP server a first SIP invite message including a Global Unique Identifier (GUID), a first SIP Uniform Resource Identifier (URI) identifying said inviting IM client and a second SIP URI identifying an invited IM client, and to interface to said invited IM client, wherein the SIP server is configured, at reception of said first SIP invite message, to investigate in the management system whether the respectively associated endpoint of said inviting IM client and said invited IM client satisfy a predetermined set of conditions, at least including whether the respective associated endpoints are idle, and the SIP server is further configured to, if said set of conditions are satisfied, transmit a second SIP invite message to said invited IM client, to receive from said invited IM client if said second SIP invite message is accepted by said IM client, a SIP invite accept message, and to instruct the management system to set up a call between the respectively associated endpoint of said inviting IM client and said invited client.

10. A system according to claim 9, wherein the SIP server is configured to book required resources for said call in the management system if said second SIP invite message is accepted by said invited IM client.

11. A system according to claim 10, wherein said SIP server is configured to tentatively book required resources for said call in the management system step if said set of conditions are satisfied, and said SIP server is further configured to for release said required resources for said call that tentatively have been booked in the management system if said second SIP invite message is not is accepted by said invited IM client.

12. A system according to claim 9, wherein the SIP server is configured to transmit an IM message to said invited IM client including information stating that a call between the respectively associated endpoint of said inviting IM client and said invited client is not allowed, and a reason for non-allowance, if said set of conditions are not satisfied.

13. A system according to claim 9, wherein said SIP server is configured to transmit an IM message to said invited IM client including information stating that said invited IM client not accepted to establish a call, if said SIP invite message not is accepted by said invited IM client.

14. A system according to claim 9, wherein said set of conditions further includes whether said inviting IM client and said invited IM client are allowed to used the respective associated conference endpoint and whether required resources for establishing and maintaining a call between the respective associated conference endpoints are available.

15. A system according to claim 9, wherein the investigating and/or booking is carried out through a web interface between the SIP server and the management system or between one of said IM clients and the management system.

16. A system according claim 9, wherein the SIP server is further configured to, if said second SIP invite message is accepted by said invited IM client, repetitively poll the management system for status information about the call, to report said status information to said inviting and said invited IM client in an IM massage, consistently, or at certain, predefined occasions.

17. The system of claim 9, further comprising:
said inviting IM client.
18. The system of claim 9, further comprising:
said invited IM client.
19. The system of claim 9, further comprising:
one of said at least one conference endpoints.
20. The system of claim 9, further comprising:
at least one of said one or more management systems.

21. A computer program product stored on a computer readable medium and containing instructions configured to cause a computing device to carry out the method recited in one of claims 1-7.

22. A system for establishing a call in a communication system including an Instant Messaging (IM) application provided by a Session Initiated Protocol (SIP) server connected to a number of IM clients, each associated with at least one conference endpoint managed by one or more management systems at least adapted to schedule and/or investigate possibilities for a conference between two or more individuals, comprising:

means for transmitting a first SIP invite message from an inviting IM client to the SIP server including a Global Unique Identifier (GUID), a first SIP Uniform Resource Identifier (URI) identifying said inviting IM client and a second SIP URI identifying an invited IM client; upon reception of said first SIP invite message in the SIP server;

means for investigating in the management system whether the respectively associated endpoint of said inviting IM client and said invited IM client satisfy a predetermined set of conditions, at least including whether the respective associated endpoints are idle;

means for transmitting, if said set of conditions are satisfied, a second SIP invite message from the SIP server to said invited IM client; and means for returning a SIP invite accept message to the SIP server if said second SIP invite message is accepted by said invited IM client and for instructing the management system to set up a call between the respectively associated endpoint of said inviting IM client and said invited client.

\* \* \* \* \*